UNITED STATES PATENT OFFICE.

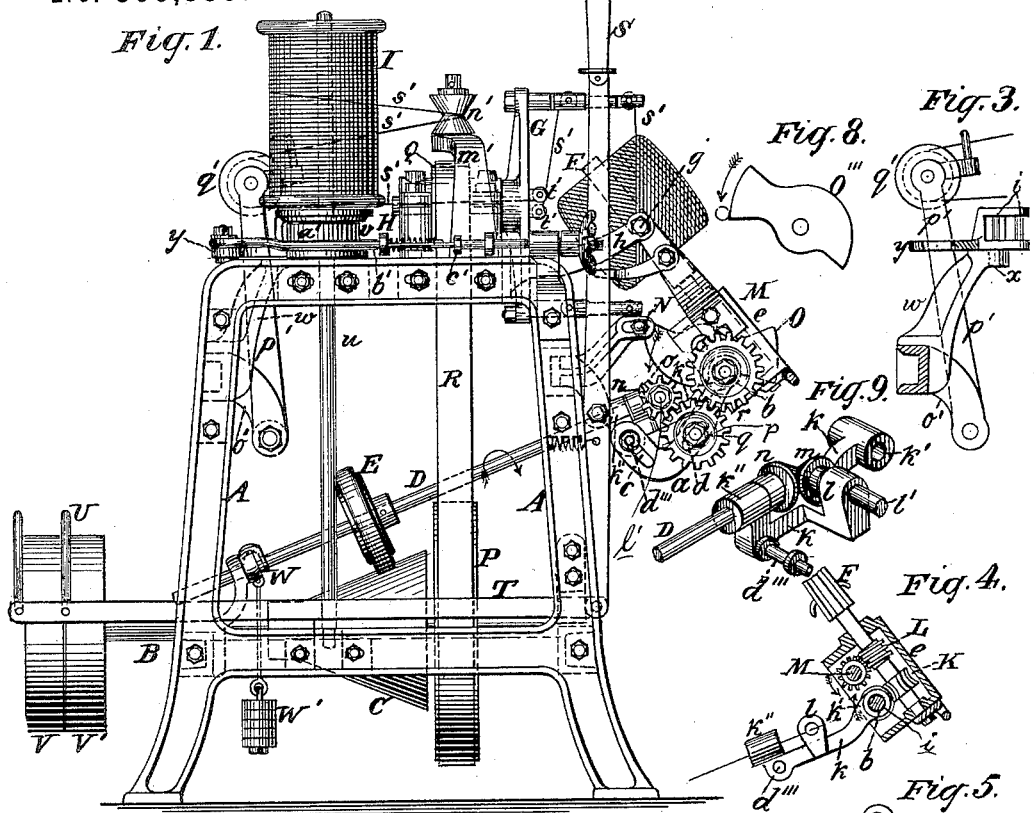

ISAAC P. MINER, OF BROOKLYN, NEW YORK, ASSIGNOR TO JOHN LOYD, OF SAME PLACE.

TWINE-BALLING MACHINE.

SPECIFICATION forming part of Letters Patent No. 399,339, dated March 12, 1889.

Application filed June 1, 1886. Serial No. 203,866. (No model.)

*To all whom it may concern:*

Be it known that I, ISAAC P. MINER, of Brooklyn, Kings county, New York, have invented certain new and useful Improvements in Twine-Balling Machines, of which the following is a specification.

My invention is an improvement in twine-balling machines, more particularly that patented by Louis J. Hirt, August 8, 1882, said patent being numbered 262,412.

The object of my invention is to adapt twine-balling machines to balling twines of widely-varying diameters in balls of various sizes and weight, in such manner that a single machine may be used for a considerable number of sizes of twines and balls, thus lessening the number of machines required for balling various sizes of twine, an improvement rendered very desirable on account of the largely-increasing demand for twines of various size used in this form, especially for agricultural purposes, as harvesting-twine, hay cord or rope, &c.

To secure this object the invention consists partly in the combination, with mechanism for winding a ball of twine, of a system of interchangeable gears and an adjustable supporting-bracket carrying bearings for said gears, by means of which different speeds of rotation upon its longitudinal axis may be imparted to the spindle upon which the ball is wound to adapt it to the winding of different sizes or diameters of twines.

By reference to the patent of L. J. Hirt, above referred to, and upon which the present invention is an improvement, it will be seen that a hollow rotating spindle and fly-arms are employed, as usual in balling-machines, and an inclining rotating fluted ball-spindle is mounted in a swinging head, the swinging head being inclined accurately and automatically at proper periods and speeds by a cam and a sliding gear-shaft which drives the ball-spindle and carries the friction-wheel, riding it to or fro upon a friction-cone, whereby a much more perfect motion of the ball-spindle and a much more compact and perfect ball is produced than was possible before the invention of said machine.

Figure 1 is a side elevation of a twine-balling machine having my improvement applied thereto. Fig. 2 is a partial top view of the same. Figs. 3 and 4 are sectional details. Fig. 5 is a view of a bracket employed for adjustable gears. Figs. 6, 7, and 8 represent interchangeable cams. Fig. 9 is a detail view of one of the brackets in perspective.

A is the frame of the machine; B, the main driving-shaft; C, the friction-cone on said shaft; D, the inclined and sliding gear-shaft; E, the friction-pulley, which derives motion from the friction-cone C and imparts rotary motion to the shaft D; F, the inclining, rotating, and corrugated spindle upon which the twine is wound; G, the fly having the hollow spindle H, through which the twine passes; I, the bobbin from which the twine is wound during the process of balling; K, the worm-wheel which imparts rotation to the spindle F; L, a worm or endless screw upon the spindle, which imparts rotary motion to the cam-shaft M; N, a stop or stop-roller against which the periphery of the cam O presses in making its rotation, by which rotation it regulates the inclination or position of the spindle F; P, a pulley keyed to the shaft B; Q, a pulley keyed to the hollow spindle H; R, a belt which imparts motion from the pulley P to the pulley Q and shaft H of the fly G. S, T, and U represent a belt-shifter, by which the main driving-belt of the machine is shifted to one or the other of the pulleys V or V'; W, a collar on the shaft D, which is attached by a link or flexible connection to a weight or weights, W', for keeping the pulley E in constant adequate frictional contact with the friction-pulley C. These parts being no part of my present invention, therefore will not need to be further described.

*a*, Figs. 1, 2, and 5, is a bracket pivoted to the shaft *b*, Figs. 1, 2, and 4, at one extremity, and having a slot, *c*, at the other extremity for adjustable connection with the stud *d'''*, Figs. 1 and 9, said bracket being bent into the form shown in Figs. 1 and 5, and having also in its middle part the slot *d*.

The shaft *b*, Figs. 1, 2, and 4, has bearings in the head *e*, which is suspended by a yoke, *f*, on pivoted bearings *g*, said bearings being in the ends of the brackets *h*, pivoted to the top of the frame A, as shown clearly in Figs.

1 and 2. Upon the shaft $b$ is fitted or formed a horizontally-rotating worm or endless screw, $i$, Fig. 4, which meshes into the worm-wheel K. A bracket, $k$, Figs. 1, 2, 4, and 9, is supported at its outer end by a hole, $k'$, Fig. 9, formed in said outer end upon the shaft $b$, and by its inner end is supported by a hole, $k''$, Fig. 9, formed in said inner end at right angles with the hole formed in the outer end, said hole passing over and embracing the shaft D, as shown at $k'''$, Fig. 9, and between the end of the bracket $k$, which engages the shaft $b$, and the other end, which engages the shaft D, is formed a bearing, $l$, for the shaft $l'$, Fig. 9, of a beveled wheel, $m$, Fig. 2, which intermeshes with a beveled wheel, $n$, keyed to the shaft D.

To the end of the shaft $l'$, Fig. 9, which is opposite the beveled wheel $m$, is keyed a spur-gear, $o$, that engages a spur-gear, $p$, Fig. 1, which rotates upon a stud-bearing, $q$, Figs. 1 and 2, said stud-bearing being adjustably held by a jam-nut in the slot $d$, Fig. 5, of the bracket $a$, or by any other suitable means. The spur-gear $p$, Fig. 1, intermeshes with a spur-gear, $r$, Figs. 1 and 2, the gear $r$ being keyed to the shaft $b$. Now the spur-gears $o$, $p$, and $r$ are interchangeable with other gears, which may be put upon the same bearings, the slots $c$ and $d$ in the bracket $a$ permitting the bearing of the intermediate gear, $p$, to be adjusted properly to intermesh with gears substituted for the gears $o$ and $r$, and by varying the number of teeth in these intermediate wheels any desired rotation upon its longitudinal axis of the spindle F, upon which the ball is wound, may be attained for the purpose of making the twine wind accurately and closely without improperly overlapping, according to the size or diameter of such twine. Various sets of these interchangeable gears may be used, as is done in changing the speed of lathes in screw-cutting, &c., and by their use the same machine is enabled to form into balls twine of very widely-varying diameters—as, for instance, from common harvest-twine up to twine one-fourth or nine thirty-seconds of an inch in diameter, and by the additional use of the interchangeable cams and the tension, hereinafter to be described, not only the compactness and uniformity of compactness or density of balls may be regulated with great accuracy, but also their shape, size, and weight.

In Figs. 1, 6, 7, and 8 are shown different forms of interchangeable cams employed with the machine for the purpose specified. The use of these cams and their action will be understood by all versed in the art, and it is therefore unnecessary to describe the contour of their peripheries and the effect upon the ball of different portions of said contour. It will be sufficient to explain their method of attachment to the cam-shaft M, which, as hereinbefore explained, is driven by the left-handed worm, L, Fig. 4, upon the spindle F, the shaft M having its bearings in the head $e$, which also carries the shaft $b$. The method of attaching the cams is not new. It consists of a clutch, $s$, as shown best in Fig. 2, a portion of the clutch being formed upon one side of the cam and the other on the shaft M, as there indicated. This clutch is of serrated variety, which permits the adjustment of the cam upon the shaft, and when properly placed the two parts of the clutch are held in engagement by means of a thumb-nut, $t$, screwed on the outer end of the shaft M.

It remains to describe the tension. Upon the spindle $u$, which carries the bobbin I, Fig. 1, is fitted a brake-wheel, $v$, and to a bracket, $w$, Figs. 1 and 2, is pivoted at $x$ a lever, $y$. From the lever $y$ projects from its middle two short arms or lugs, $z\,z'$, Fig. 2. To these arms are attached a friction-band, $a'$, which passes around the friction-pulley $v$ and tends to retard the rotation of the bobbin. To the outer end of the lever $y$ is pivoted a bar, $b'$, and upon the bar $b'$ is fitted a cross-head, $c'$. The bar $b'$ passes through a cross-head, $d'$, and plays freely through an opening therein. The cross-head $d'$ is joined by bars $e'$ to a third cross-head, $f'$. Rigidly connected to and extending from the cross-head $f'$ is a rod, $g'$, which passes through a bracket, $h'$, and is screw-threaded at the end remote from the cross-head $f'$, as shown at $i'$, and upon the screw-threaded part of the rod $g'$ is fitted a thumb-nut, $k'''$. Between the cross-heads $c'$ and $d'$ is fitted a spring, $l'$. The thumb-nut $k'''$ serves to adjust the tension of the spring $l'$ and the action of the spring $l'$ between the cross-heads $d'$ and $c'$. The latter cross-head, sliding freely on the rods $e'$, serves to tighten the friction-band $a'$ upon the friction-pulley $v$.

To a bracket, $m'$, bolted to the top of the frame, is pivoted a grooved pulley, $n'$. To a bracket, $o'$, extending from a portion of the frame A, as shown in Fig. 1, is pivoted, at its lower end, a lever, $p'$, which carries at its upper end a grooved pulley, $q'$, as shown in Figs. 1 and 2. The end of the lever $y$ opposite the rod $b'$ is bifurcated, as shown at $r'$ in Fig. 2, and the lever $p'$ passes up through the bifurcations of the lever $y$, so that any motion of the lever $y$ upon its pivot $x$ will impart motion to the lever $p'$ in a vertical plane radially around the pivot which attaches it to the bracket $o'$. Now the thread or twine $s'$ on its way to the fly passes first around the grooved pulley $n'$, next around the grooved pulley $q'$, next to and through the hollow spindle H, and between guide-rollers $t'$, Fig. 1, and thence to and along the arm of the fly in the usual manner.

It will be seen that the action of the thread from the fixed pulley $n'$ to the movable pulley $q'$ tends to draw the pulley $q'$ toward the grooved pulley $n'$, and thus to oppose the action of the spring $e'$ upon the opposite end of the lever $y$, the motion of the lever $p'$ acting in the bifurcation of the horizontal lever $y$ producing this result, and whenever the spring pulls the end of the lever $y$, pivoted to the rod $b'$, toward said spring the action of the thread $s'$ between the pulley $n'$ and the pulley $q'$ opposes the action of the spring. The result of this arrangement is a perfectly-uniform tension of thread, $s'$, for whenever by any unevenness in the winding of the bobbin or from other causes there is a tendency to slacken the tension of the thread between the bobbin and the pulley $n'$ that portion of the thread or twine between the pulley $n'$ and the pulley $q'$ is also slackened in its tension, and the spring then acting more forcibly tightens the friction-band $a'$ upon the friction-pulley $v$, and thereby makes up for the looseness of tension caused by the inequality of the thread on the bobbin or other source of inequality. On the contrary, whenever the tension of the thread between the bobbin I and the pulley $n'$ is increased from any cause, the tension of that part of the thread which lies between the pulley $n'$ and the pulley $q'$ is also increased, and the action of the spring is opposed, thereby relieving to some extent the action of the friction-band upon the friction-pulley $v$, and thus making the sum of the tensions constant, which is the object sought. The result is that balls of twine are wound with extraordinarily uniform compactness or density. Moreover, as the friction-pulley is made of metal, as is also the friction-band upon the same, great durability is secured, and as a smooth surface is constantly maintained the action is exceedingly uniform.

Having thus described my improvement, what I claim as new, and desire to secure by Letters Patent, is as follows:

The combination, with the inclined shaft D, of the spindle F, head $e$, the yoke $f$, fly G, brackets $h$ and $k$, cam O, stop N, worm-gear K, worm $i$, shaft $b$, worm or endless screw L, the cam-shaft M, bracket $a$, shaft $l'$, gears $m$ $n$, and interchangeable gears $o$, $p$, and $r$, for changing the speed of the spindle F on its longitudinal axis in balling twines of different sizes or diameters, substantially as and for the purpose set forth.

ISAAC P. MINER.

Witnesses:
JNO. E. GAVIN,
LEICESTER ALLEN.